US008555164B2

(12) United States Patent
Huang et al.

(10) Patent No.: US 8,555,164 B2
(45) Date of Patent: Oct. 8, 2013

(54) METHOD FOR CUSTOMIZING AVATARS AND HEIGHTENING ONLINE SAFETY

(76) Inventors: Ding Huang, Penshurst (AU); Eckhard Kemmerer, Sydney (AU)

(*) Notice: Subject to any disclaimer, the term of this patent is extended or adjusted under 35 U.S.C. 154(b) by 776 days.

(21) Appl. No.: 10/862,396

(22) Filed: Jun. 8, 2004

(65) Prior Publication Data

US 2004/0250210 A1    Dec. 9, 2004
US 2012/0216116 A9    Aug. 23, 2012

Related U.S. Application Data

(63) Continuation-in-part of application No. 10/416,459, filed as application No. PCT/AU01/01539 on Nov. 27, 2001.

(30) Foreign Application Priority Data

Jun. 6, 2003  (AU) ............................ 2003902845
Sep. 8, 2003  (AU) ............................ 2003904864
Oct. 10, 2003 (AU) ............................ 2003905525

(51) Int. Cl.
*G06F 3/048* (2013.01)
(52) U.S. Cl.
USPC ........... 715/706; 715/733; 715/751; 715/757; 715/758; 715/848
(58) Field of Classification Search
USPC .................. 715/706, 733, 751, 757, 758, 848
See application file for complete search history.

(56) References Cited

U.S. PATENT DOCUMENTS

| 5,818,452 | A |   | 10/1998 | Atkinson et al. |
| 5,880,731 | A | * | 3/1999  | Liles et al. .................. 715/758 |
| 5,892,691 | A |   | 4/1999  | Fowler |
| 6,031,539 | A |   | 2/2000  | Kang et al. |
| 6,064,390 | A |   | 5/2000  | Sagar et al. |
| 6,147,692 | A | * | 11/2000 | Shaw et al. .................. 345/643 |
| 6,317,130 | B1|   | 11/2001 | Ishikawa et al. |
| 6,400,368 | B1|   | 6/2002  | Laperriere |
| 6,486,882 | B1| * | 11/2002 | Wolverton et al. .......... 345/475 |
| 6,535,215 | B1|   | 3/2003  | DeWitt et al. |
| 6,714,661 | B2|   | 3/2004  | Buddenmeier et al. |
| 6,731,287 | B1|   | 5/2004  | Erdem |

OTHER PUBLICATIONS

EverQuest, GameSpot Game Guide: EverQuest: The Ruins of Kunark, Jun. 21, 2001, pp. 1-14.*
Singh, K. Fiume, E., Wires: A Geometric Deformation Technique, Jul. 1998, Proceedings of the 25th annual conference on Computer graphics and interactive techniques, pp. 405-414; http://www.graphicon.ru/oldgr/library/siggraph/98/papers/singh/singh.pdf.*

(Continued)

*Primary Examiner* — Andrey Belousov
(74) *Attorney, Agent, or Firm* — Leason Ellis LLP

(57) ABSTRACT

The present invention, a method for a customizing and determining how a multimedia character or avatar is animated. The method provides a user with interaction with the avatar that involves animation of the face of the multimedia character. In addition, the method further comprises offering the multimedia character or avatar with a default setting for a mechanism of muscle movement and interacting with the mechanism of muscle movement. Further, the method is preferably used in a stand-alone mode and with multimedia communication, such as Internet, email and wireless applications. Furthermore, the method comprises a set rules and intelligent systems for analyzing, displaying and capturing messages and alerting the user to these messages in real time.

19 Claims, 8 Drawing Sheets

(56) References Cited

OTHER PUBLICATIONS

Huang, et al. "NURBS curve controlled modeling for facial animation", Computers & Graphics, vol. 27, No. 3, pp. 373-385, Jun. 2003.
Huang et al., "Modeling of facial expressions using NURBS curves," Lecture Notes in Computer Science, vol. 2252, pp. 216-223, Springer, Berlin, 2001.
Chen, D., Zeltzer, D. Pump It Up: Computer Animation of a Biomechanically Based Model of Muscle Using the Finite Element Method, Jul. 1992, ACM, Proceedings of the 19th annual conference on Computer graphics and interactive techniques, pp. 89-98.
Terzopoulos, D., Walters, K., Physically-Based Facial Modelling, Analysis, and Animation, Jan. 1990, Journal of Visualization and Computer Animation, pp. 1-18.
Pourazady, M., Xu, X., Direct manipulations of B-spline and NURBS curves, Feb. 2000, Advances in Engineering Software, vol. 31, Issue 2. pp. 107-118.
Singh, K., Fiume, E., Wires: A Geometric Deformation Technique, Jul. 1998, Proceedings of the 25th annual conference on Computer graphics and interactive techniques, pp. 405-414.
Gagvani, N., Kenchammana-Hosekote, D., Silver, D., Volume Animation using the Skeleton Tree, 1998, IEEE Symposium on Volume Visualization, pp. 47-54.
Lamousin H. Waggenspack, W., NURBS-Based Free-Form Deformations, 1994, IEEE Computer Graphics & Applications, vol. 14, No. 9, pp. 59-65.
Schmalstieg, D., Fuhrmann, A., Coarse View Dependent Levels of Details for Hierarchical and Deformable Models, 1999, Technical Report TR-186-299-20, Vienna University of Technology, pp. 1-13.

* cited by examiner

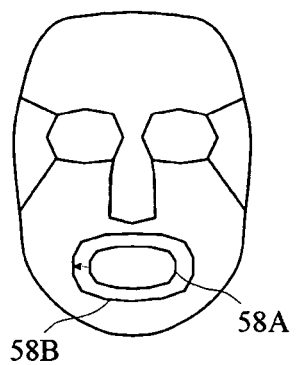
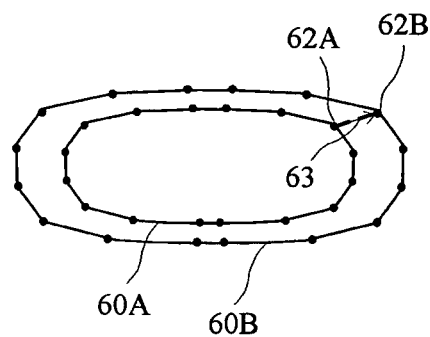
FIG. 6          FIG. 7
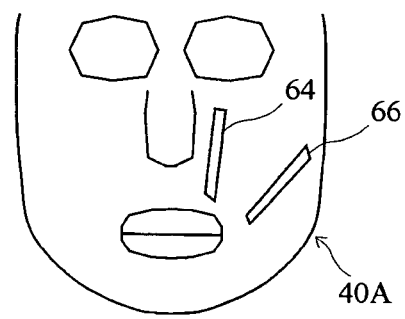
FIG. 8

METHOD FOR CUSTOMIZING AVATARS AND HEIGHTENING ONLINE SAFETY

CROSS REFERENCE TO RELATED APPLICATIONS

This application is a continuation-in-part of prior non-provisional application Ser. No., 10/416,459 filed Oct. 6, 2003. This application also claims the benefit of Australian Provisional Patent Applications 2003902845 (filed Jun. 6, 2002), 2003904864 (filed Sep. 8, 2003), and 2003905525 (filed Oct. 10, 2003, all to the Australian Patent Office, by the present inventor.

FEDERALLY SPONSORED RESEARCH

Not applicable

SEQUENCE LISTING OR PROGRAM

Not applicable

BACKGROUND OF THE INVENTION—FIELD OF INVENTION

This invention relates to the fields of avatar creation, multimedia communication, specifically to exchange of visual and audio information in online communication. This invention also relates to the area of safety in online communication.

BACKGROUND OF THE INVENTION

With the increase power of computer hardware and communication bandwidth, graphic avatars are becoming more practical, especially in multimedia communication, e.g. online chat sessions. In the prior art, there are several major approaches with respect to the interaction between ordinary computer users and graphic avatars:
  (a) A user can select one of a plurality of different avatars or virtual characters, to represent the user him/herself.
  (b) A user can select different components (e.g. mouth, eyes and nose) of an avatar, which is similar to crime identification in police department.
  (c) A user can build an avatar from one or a plurality of photos. Thus, the avatar resembles the subject on the photo.

In approaches (a) and (b), the user's identity is hidden since an avatar does not resemble the user. In approach (c), the subject's identity is not hidden. There are some applications (e.g. online chat) where the identities are desired to be covert.

In all the above approaches (a), (b) and (c), the users have little room for creativity activity in setting the avatars. An avatar is either chosen from predefined ones, or is generated from photos. In contrast, in the real world, one can create customized characters by drawing on paper, etc.

On the other hand, computer animation methods in the prior art are generally complex and time-consuming. Thus, professional animators are needed to create virtual characters or avatars. Usually, the more realistically an avatar, the more time-consuming it takes to create the avatar. As a result, ordinary users are unable to customize animation, e.g. determine expressions and speeches of avatars. Thus, animation (e.g. expression) of avatars in the prior art is basically predetermined by professional animators, even though users can superficially set the avatars.

In the prior art, online safety for users is problematic. For example, an adult can pretend to be a youngster in online chat sessions, and eventually lure and harm youngsters. In the prior art, filtering software (e.g. parental monitoring software) is used to protect young users of online application (e.g. online chat). The functions of the monitoring software are limited to recording visited web sites, capturing the screen when certain keywords are typed, and logging conversations. However, the protection of children is no real-time, and potential predators are not discouraged or penalized promptly. Furthermore, a substantial amount of offline time is needed from parents, who may be very busy.

Another way to battle online crime in the prior art is that the law enforcement personnel go online as youngsters and lure predators or pedophiles into a trap. This method is not efficient at all, because of the ratio of possible enforcement personnel to potentials predators.

Therefore, the methods heretofore known suffer from a number of disadvantages, which include:
  (a) Ordinary computer users have little room for creative activity in setting the animation of avatars.
  (b) If a user's identity is hidden, an avatar that represents the user offers little clue about the user, since the animation of the avatar is mostly predefined by animators.
  (c) There lack effective ways to protect online users, e.g. in chat sessions.

BACKGROUND OF INVENTION—OBJECTS AND ADVANTAGES

The present invention defines a method for an ordinary computer user to customize a virtual character or avatar, so as to determine how the character is animated afterwards. The animation method used is preferably intuitive and simple. Interaction with the virtual character can preferably involve animation of its face. The method can be used in stand-alone applications and multimedia communication, such as online chat room and email. Users may be able to be creative in the process of animation, thus revealing personal flavors and personality traits through the virtual characters. Therefore, other users viewing a virtual character may better understand the creator of the character. The method has several benefits, which include offering customized avatars and heightening online safety, especially for young users in online chat sessions.

The present invention defines a method to intelligently process messages, which may be sent through online chat sessions, so as to alert potential victims and discourage predators or pedophiles. The method uses intelligent systems that are loaded with a set of rules. By analyzing the messages against these rules, potentially damaging messages can be detected. Then, instructions can be triggered by the intelligent systems. Preferably, graphic outputs will be displayed to alert potential victims and discourage predators. This service can be rendered in real time.

Accordingly, several objects and advantages of this invention are:
  (a) Users are protected in real-time.
  (b) Potential predators are discouraged in real time.
  (c) Parenting load that may be needed in the prior art is significantly decreased or diminished.
  (d) Decrease the pressure of law enforcement personnel.

Still other objects and advantages will become apparent from a consideration of the ensuing description and drawings.

SUMMARY

In accord with the present invention, a method is defined for an ordinary computer user to customize an avatar, so as to determine how the avatar is animated afterwards. The animation method used is preferably intuitive and simple so that ordinary computer users can learn and manipulate avatars easily and efficiently. Interaction with the virtual character can preferably involve animation of its face. Preferably the invention comprises the steps of offering an avatar a default setting of a mechanism of muscle movement, and a user interacts with the mechanism of muscle movement so as to customize the avatar. The method is preferably used in stand-alone application and multimedia communication, such as Internet, email and wireless applications. Users are able to be creative in the process of animation, thus may reveal personal flavors and personality traits through an avatar.

In accord with the present invention, a method is defined for an intelligent system to analyze potentially damaging information, and send special signals to users in real time, so as to alert potential victims and discourage predators.

The present invention defines a method to intelligently process messages that are being sent through online chat sessions, so as to alert potential victims and discourage predators or pedophiles. The method uses intelligent systems that are loaded with a set of rules. By analyzing the messages against these rules, potentially damaging messages can be captured. Then, instructions can be triggered by the intelligent systems. As a result, graphic outputs will be displayed to alert potential victims and discourage predators. The services can be offered in real time.

DRAWINGS—FIGURES

FIG. 6 shows an example in which the boundary of mouth area is changed in basic animation.

FIG. 7 illustrates that a boundary of the areas approximates the locations of control points.

FIG. 8 illustrates an interface that allows a user to modify virtual muscles.

DESCRIPTION OF THE PREFERRED EMBODIMENT

In this patent document, an avatar means a virtual character. Since the face is the most expressive part of a virtual character, this document focuses on the virtual face. Thus, an avatar and a virtual face are interchangeable in this document. If it is not otherwise stated, avatars in this document are three-dimensional models.

Figure 1:
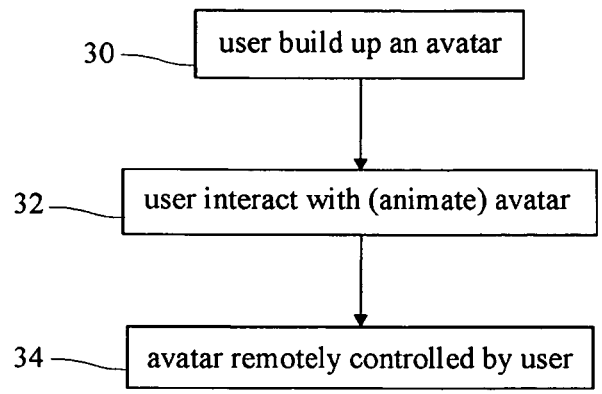
FIG. 1 shows a general procedure of the present invention.

The implementation of the present invention is illustrated in FIG. 1. The procedures are described as follows.

Avatar Buildup

A user can select an avatar from a number of predefined 3D avatars 30. The chosen avatar can then represent the user him/herself 32. The selection may be done either online or offline, e.g. from a CD-ROM disk. A normal graphic interface can allow a user to select the avatars. Alternatively, a user can also build an avatar from realistic photos. Afterwards, the avatar can be remotely controlled by the user 34.

Figure 2:
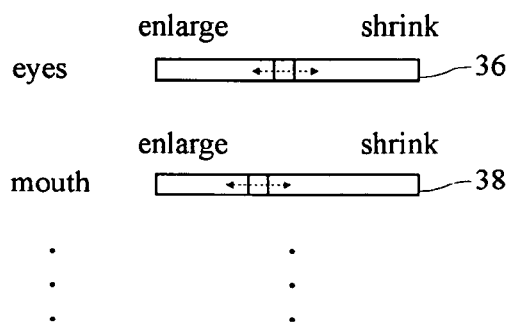
FIG. 2 illustrates a dialog box in customizing an avatar.

Preferably, a user should be able to modify the chosen avatar. The modification can be done by interactively using a mouse connected to a computer, or using a dialog box. The purpose of modification is to allow a user to customize the static geometry of the avatar. FIG. 2 illustrates a dialog box for this purpose. A user can modify facial features by using interactive controls 36 and 38.

Figure 3:
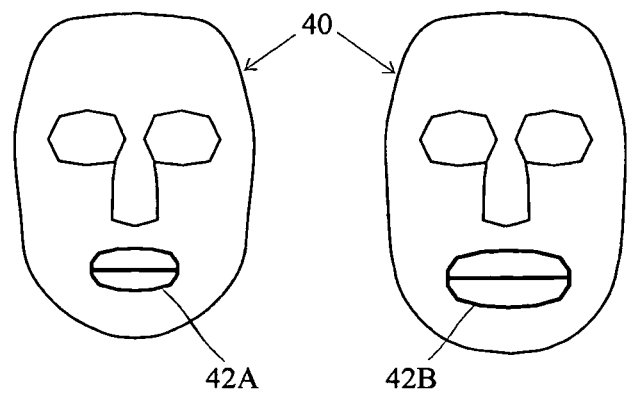
FIG. 3 illustrates an example in which a simulated mouth is enlarged.

Since a 3D avatar is usually represented by a polygonal model, modification of an avatar can be done by changing the geometry of the model. For example, enlarging mouth can be done by increasing the geometric area (3D volume) of a simulated mouth. FIG. 3 illustrates an example in which the mouth is enlarged from 42A to 42B in an avatar (virtual face) 40. Conventional 3D animation can offer many modification tools, e.g. free form deformation. If a user modifies a model by using a high-level interface (e.g. dialog box), the modification can be done implicitly.

For FIG. 3 and other figures in this patent document, all operations on avatars are meant to be in 3D space. The figures illustrate on 2D for simplicity.

Figure 4:
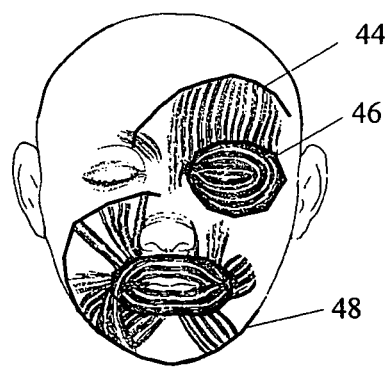
FIG. 4 illustrates the default setting of control polygons, which are located near the ends of simulated muscles.

To allow ordinary computer users to customize avatars, animation methods can preferably be intuitive and effective to ordinary users. A novel method in 3D modeling and animation was proposed by Huang*. Huang used rational curves (NURBS curves) to simulate muscle movement. This patent document takes the method as a preferable implementation that allows ordinary users to effectively customize avatars. Please refer to documents at the end of this specification for technical details. Because human face anatomy is well known, by default the rational curves on avatars can be set on the basis of real muscles (Huang*). FIG. 4 illustrates the default setting of control polygons (44, 46 and 48) of the rational curves, in which the control points are located near the ends of virtual (or simulated) muscles. The connection of control points of a curve forms a control polygon. This default setting of curves offers an embedded mechanism of muscle movement. Users are however allowed to modify on the basis of the default setting (discussed shortly).

Figure 5:
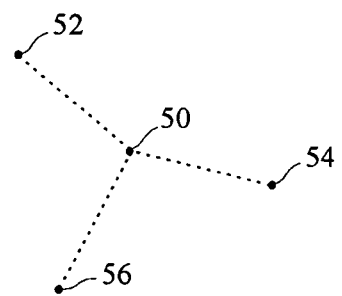
FIG. 5 illustrates embedding control points with feature points in a generic avatar.

Control points of rational curves can be embedded in a generic avatar (face model). FIG. 5 illustrates the approach. In FIG. 5, points 52, 54 and 56 are three figure points on a generic avatar. For example, 52, 54 and 56 can be an out corner of an eye, a low-out corner of the nose and an out corner of the mouth respectively. Point 50 is any control point of a rational curve in the area. All points are located in three-dimensional space, each with (x,y,z) coordinates. The point 50 can be determined from 52, 54 and 56, e.g.

$$P = r*I + s*J + t*K$$

where r, s and t are scalar coefficients. Coefficients can be set individually for each coordinate component, i.e. x, y and z. P, I, J and K represent the vectors to the points 50, 52, 54 and 56 respectively. In other embodiments, multiple feature points can be used in determining a control point. In other words, more then three feature points may appear in the above formula, each with a weighting coefficient. The coefficients can be calculated when a generic avatar is created and curve points are positioned according to the techniques in FIG. 4.

Therefore, control points can be embedded in a generic avatar. When the geometry of a generic avatar is modified or customized, the positions of the control points will be automatically updated, and the rational curves can be recalculated accordingly. Since control points are located near ends of the muscles and all human faces have the same muscles, the association (embedding) of control points can be standardized across all avatars.

Embedding control points in this way offers flexibility of avatar customization. Some industry standard (e.g. MPEG-4) specifically requires face models (avatars) to have a set of feature points. Therefore, another benefit of this approach is compatibility.

Avatar Customized by User

Conventional multimedia applications (e.g. graphic online chat) basically only allow ordinary users to select from predefined avatars, their components or gestures, etc. Thus ordinary users have little room for creative activity. This is because conventional animation methods are complex and not intuitive to users. Thus, the skills and time span required for conventional animation are beyond the reach of ordinary users.

Interaction with an avatar is called user controlled animation in this document. User controlled animation can be separated into basic animation and advanced animation. They are different in technical requirement to users. But basic animation and advanced animation have the same purpose, which is to allow users to be creative and to generate sufficient variety of avatars through their interaction with the avatars.

In basic animation, a user can interactively change the boundaries of areas by using a mouse. FIG. 6 shows an example, in which the mouth boundary is changed from 58A to 58B. Unlike the modification during building up of avatars (e.g. FIG. 3), this phase doesn't affect static geometry of an avatar, instead affects the areas that are influenced by simulated muscles. The surface of a virtual face is separated into a number of areas (e.g. mouth, eyes), and each area is affected by one or more rational curves (Huang*). Thus, after a user changes the area boundaries, the areas affected by different simulated muscles will be changed. In addition, control points of rational curves are positioned near muscle ends (Huang*). The boundaries of the areas can approximate the locations of muscle ends and thus control points of the curves, as illustrated in FIG. 7. Thus, changing area boundaries also modifies the locations of the control points, which in turn modifies the curves. In FIG. 7, control points, like 62A on an original boundary 60A, are moved to new positions, like 62B on a new boundary 60B, along simulated muscles like 63.

In advanced animation, a user can directly modify virtual muscles, which are simulated by rational curves. Since rational curves simulate muscle movement (Huang*), modification of virtual muscles can also modify the curves. However, the curves are hidden from users and only virtual muscles are visible. FIG. 8 illustrates an intuitive interface that allows a user to modify virtual muscles. On an avatar or a virtual face 40A, virtual muscles like 64 (representing a sneering muscle) and 66 (representing a smiling muscle) are displayed and a user can interactively manipulate them. The location of these muscles can approximate the locations of real muscles. The virtual muscles can be rendered in a different color from background face area, so the muscles can be identified and modified. When a user moves a cursor over a muscle, a small text box near the cursor can be prompted to tell what muscle it is (e.g. smiling muscle or the zygomaticus major muscle, sneering muscle or the levator labii superioris muscle, etc). Alternatively, a higher-level interface can modify several muscles simultaneously. For example, an interface can allow users to change forcefulness of expressions (e.g. happiness and sadness), and each expression will be affected by several muscles. The association between expressions and muscles can be implemented by simple data structures, e.g. arrays.

A user can modify characteristics of a muscle, e.g. its length, direction, in 3D space. Multiple windows can display on a computer screen multiple views of a 3D face model. For example, one window shows a front view and another shows a side view. When a user modifies a virtual muscle in one window, the effect of the modification can be observed in both windows. The length of a muscle can be modified by moving the end of the muscle which is approximated by control points of rational curves (refer to FIG. 4). The directions of muscles are approximated by 3D gradients, which determine how the curves affect polygonal vertices of an avatar (Huang*). Thus, modifying directions of muscles changes the 3D gradients. There can be constraints in how much the length and direction of a muscle can be modified. For example, the simulated smiling and sneering muscles should not cross each other, since the real smiling and sneering muscles do not cross.

By default, the control points of rational curves are located near surface boundary of an avatar (Huang*), but the users should have the freedom to move muscle ends (approximated by control points) substantially below or above the boundary. An important purpose of this freedom is to enable sufficient variety of animation.

Figure 9:
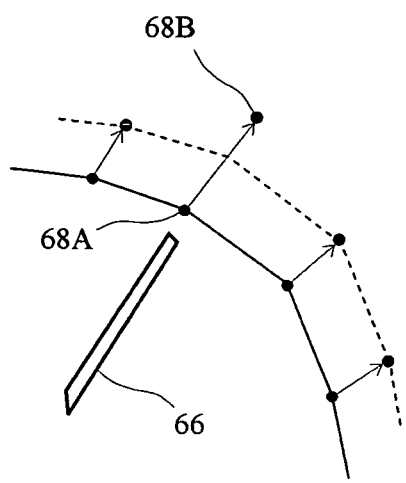
FIG. 9 illustrates an example in which a control point simulating a strengthened muscle is moved a greater amount of distance than other control points.

The present invention also allows a user to strengthen or weaken a muscle. The effect of a muscle is simulated by one or more control points of a rational curve (Huang*). When a muscle is strengthened, a control point simulating the muscle can be more substantially modified than other control points of a curve, vice versa for weakening a muscle. To simulate expressions or speeches, a curve can be modified by repositioning control points or changing weights (Huang*). FIG. 9 illustrates an example, in which a control point 68A approximating a strengthened muscle 66 is moved a greater amount of distance than other control points, to a new position 68B. In FIG. 9, the additional movement of the control point can be proportional to the amount of the strengthening, e.g. the number of mouse clicks on the virtual muscle. There can be constraints in how many times the muscle can be strengthened, or how much distance the control point can be moved. The constraints can be pre-determined in a generic avatar. For example, the maximum variation from a default setting can be one quarter of the width of the avatar, if control points are repositioned. Visual feedback can be given to indict the successful strengthening, e.g. the virtual muscle becoming stronger or thicker.

Figure 10:
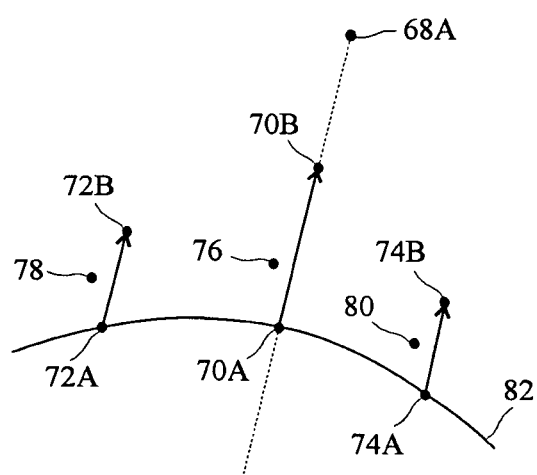
FIG. 10 shows the effect of curve points and vertices after the modification of control points.

When a control point like 68A is modified as in FIG. 9, points on a curve 82 closer to 68A can move greater distances than other points further away from 68A. As illustrated in FIG. 10, curve point 70A is closer to 68A or influenced more substantially by 68A (Huang*) than curve points 72A and 74A. Points 70A, 72A and 74A move to new position 70B, 72B and 74B respectively. Because 68A is moved a greater distance than other control points of the curve, the movement distance from 70A to 70B will be larger than other distances like from 72A to 72B, and 74A to 74B. The vertices of an avatar are associated with the curve points and the association is based on anatomy (Please refer to Huang*). As a result, the vertices of the avatar (e.g. 76) closer to the line from 70A to 70B will move greater distances than other vertices further away (e.g. 78 and 80) from the line. Since 68A can approximate a muscle end and the line from 70A to 70B can approximate a strengthened muscle as in FIG. 9, the simulation will make the area near the strengthened muscle move more forcefully, which is very realistic. Besides repositioning control points, weights of control points can be modified (Huang*).

Therefore, a realistic simulation can be intuitively achieved by simply modifying a small number of control points based on users' interaction on virtual muscles. Significant benefits of this approach include that the connection between the user interaction and underlying operation is intuitive and straight forwards, the simulation mechanism is anatomy-based and thus the result is realistic. Therefore, users can very intuitively customize avatars.

The animation methods described are intuitive and effective. Users only interact with the virtual muscles. The underlying operation (e.g. mathematical) is hidden from users. Furthermore, users can be creative in the process of animation or interaction with virtual faces. Besides being intuitive and effective to ordinary computer users, the animation methods should preferably offer sufficient facilities so that users can generate a great variety of animation. Therefore, other animation methods satisfying this requirement may also be used in user controlled animation, i.e. within the scope of this invention.

Animation of Avatar

Once an avatar is customized, it can be used in stand-alone applications or multimedia communication.

Figure 11:
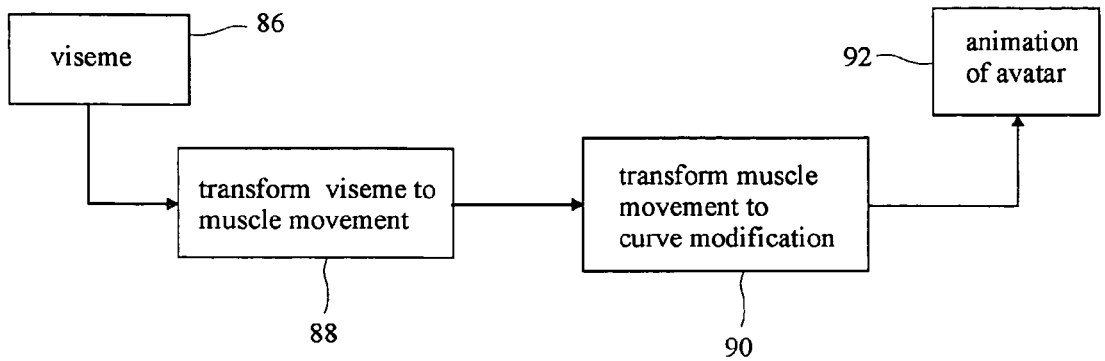
FIG. 11 illustrates a high-level abstraction of the implementation of stand-alone applications.

In stand-alone applications, the customized avatar can act as a general 3D graphic interface. The avatar can be displayed in a graphic window, e.g. OpenGL window. For example, it can read out a text file. A text-to-speech (TTS) system (e.g. Microsoft Speech SDK) can convert the unconstrained text to a string of phonemes, which will be spoken out from a microphone. At the same time of speech processing, visemes can be determined by TTS. Visemes are visual mouth shapes that occur during speech. Thus, visemes can be transformed to the movement of muscles (e.g. the zygomaticus major muscle). Since curve modification intuitively simulates muscle movement (Huang*), then visemes can thus be simulated by modifying the curves. By modifying the curves according to the visemes, the avatar can generate facial movement that matches the speech. FIG. 11 illustrates a high-level abstraction of the implementation of the stand-alone applications. Visemes 86 are fed to a functional module that transforms visemes to muscle movement 88. Parameters representing muscle movement are then fed to a functional module that transforms muscle movement to curve modifications 90. Then avatar animation 92 is outputted. FIG. 11 focuses on the visual aspect. The applications should also have other functions of file opening, phoneme processing, etc.

In multimedia communication, the avatar can be selectively published, i.e. uploaded to the server maintained by a service provider. The application areas of multimedia communication include but not limit to Internet, email and wireless. In an online application (e.g. email or chat), the avatar can be sent to other users who are connected to the server. Thus, the avatar can represent its creator. The avatar can express/speak in a way that is genuinely determined by its creator. For example, in an online chat session, a user can input a line of text. When the text is sent to a remote site, it will be spoken out by the customized avatar. The techniques of stand-alone applications can be used in the remote site.

Figure 12:
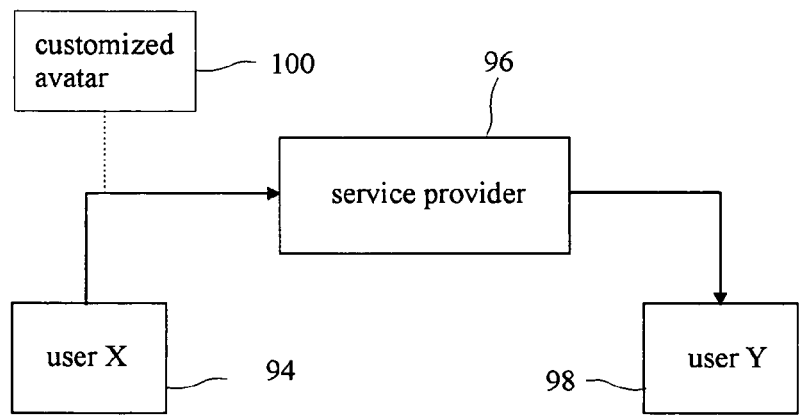
FIG. 12 illustrates using customized avatars used in multimedia communication.

FIG. 12 illustrates an embodiment. A user X 94 uploads a customized avatar 100 to a service provider 96. The service provider 96 can provide Internet services, email or wireless services. User Y 98 can also connect to the service provider 96 and download the customized avatar 100. Afterwards, the customized avatar 100 can act as a graphic agent for user X 94. If user X 94 sends email to user Y 98, the email message can be spoken out by the avatar 100. If users X 94 and Y 98 are in the same online chat session, the avatar can also speak out user X's message in user Y's local computer. If users X 94 and Y 98 have frequent communication, user Y 98 can save the avatar in his/her local computer. The avatar can be saved as a set of vertices and related texture images. Thus, the avatar can be uploaded and downloaded only when user X 94 modifies it.

In wireless applications, the avatar can be animated while speak out messages in wireless devices (mobile phones). Users may prefer to look at (customized) speaking avatars, thus moving wireless devices away from their heads. As a result, it may help to decrease the potential risk of radiation from high frequencies. Therefore, the present invention offers a benefit of risk reduction in wireless communication.

Since the avatar is affected by both visemes and emotions. Their effect can be blended together. The following formula shows one embodiment of the blending:

$$V = aV_v + bV_e$$

where V is the movement of a vertex on the face model. $V_v$ is the movement contributed by a present viseme and $V_e$ is the movement contributed by an emotion. They have scalar coefficients a and b respectively. We can have a+b=1 and a>0, b>0. V, $V_v$ and $V_e$ are vectors. $V_v$ and $V_e$ both approximate muscle movement and can be obtained from the above description. In addition, the vectors can be affected by personality, culture, etc. In other words, the movement of a polygonal vertex can be a sum of vectors, each of which individually represent elementary movement from either speech or emotion. As a result, an ordinary user can intuitively determine how an avatar expresses and speaks.

Figure 13:
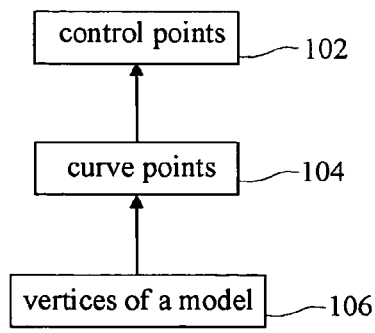
FIG. 13 illustrates the control hierarchy used in the present invention.

In multimedia communication, the avatar can be interactively and remotely controlled by its creator. After the interaction with avatars, only information representing the modification needs to be sent through a communication channel. For example, in the modification in FIG. 9, only parameters that represent update of a single control point will be sent, if the user only remotely modifies one muscle. FIG. 13 further illustrates the control hierarchy used in the present invention. As shown in FIG. 13, control points 102 affect points 104 on rational curves, which in turn affect vertices 106 of an avatar (or model).

The technology is especially suitable for using in multimedia communication. Because of the hierarchy, a decoder generally needs to know only high-level parameters (i.e. control points). Therefore, the technology can significantly improve coding efficiency and can be very economic in terms of communication bandwidth. This advantage is crucially important in communications where bandwidth is a precious resource, e.g. wireless.

Figure 14:
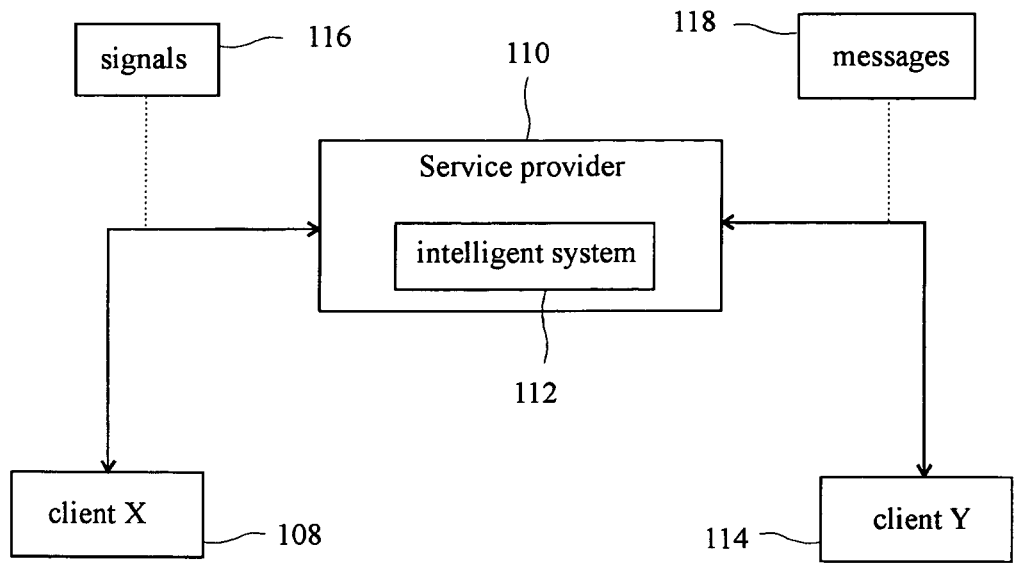
FIG. 14 illustrates the overview of the present invention.

FIG. 14 illustrates an overview of another aspect of the present invention. Client 108 and client 114 both connect to a service provider 110, who may provide online services (e.g. chat sessions). Suppose client 108 uploads messages 118 to the service provider 110, then the messages 118 are downloaded to client 114. An intelligent system 112 or filter analyzes the messages 118 in this process. The intelligent system 112 may reside in a server of the service provider 110, or any of the clients. The intelligent system 112 can be implemented using software, hardware. It can have any level of machine intelligence and machine learning capabilities. If the intelligent system 112 finds potentially damaging info in the messages 118, special signals 116 will be sent to the clients. For example, alert signals will be sent to client 114 and discouraging signals will be sent to client 108. The details of the implementation will be given as follows.

Figure 15:
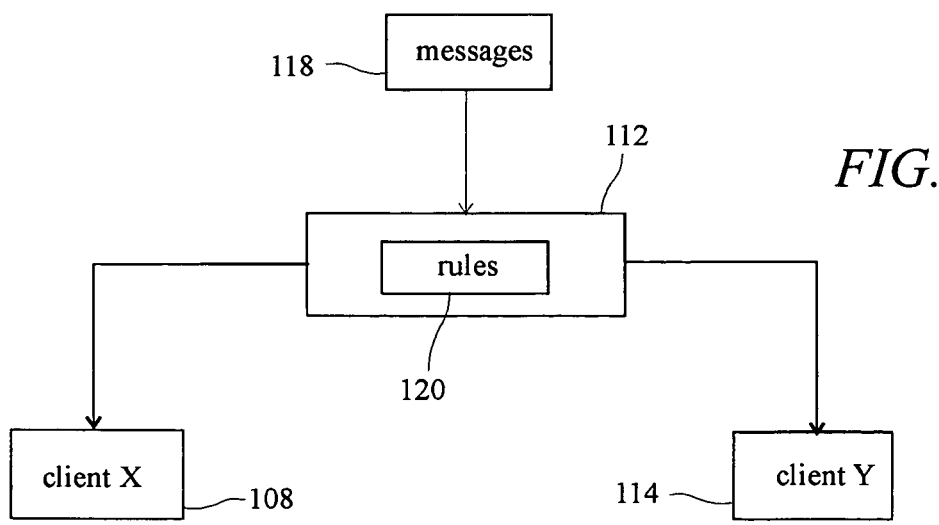
FIG. 15 illustrates the work flow of the intelligent system in FIG. 14.

FIG. 15 illustrates the work flow of the intelligent system in FIG. 14. Messages 118 sent between clients are analyzed by the intelligent system 112. Messages 118 can be a number of formats, including texts input by a client, recognized speech from a client, etc. The intelligent system 112 contains a number of rules 120 that are used to monitor potentially damaging information. The following are some examples that the rules 120 may be monitoring:

(a) What is your phone number?
(b) Where do you live?
(c) How about a date?
(d) Meet you at . . .

The rules 120 can be set by a service provider 110 or parents of young users. Rules 120 can be pre-determined or dynamically set, or learnt using any intelligent method.

In FIG. 15, the messages 118 are analyzed against the rules 120. For example, the messages 118 can be scanned to see if they contain any of the monitored requests (e.g. (a) to (d)), or their variations. If potentially damaging requests are detected, special instructions (122 in FIG. 16) are triggered by the intelligent system and sent to clients. For example, alert signals are sent to client Y 114 and discouraging signals are sent to client X 108.

Figure 16:
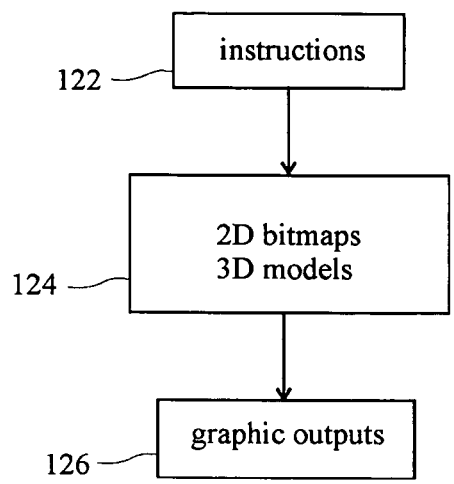
FIG. 16 illustrates instructions are used to generate graphic outputs.

Since visual information is crucially important to human beings, FIG. 16 illustrates a preferred embodiment in which the instructions 122 generate graphic outputs 126. Instructions 122 can first act on a graphic database 124, which may contain two-dimensional (2D) bitmaps or three-dimensional (3D) models. The bitmaps and models can be customized by clients. Customizing 3D models is disclosed in the previous part of this document.

If potentially damaging requests (e.g. asking for phone number) are detected by the intelligent system 112, the instructions 122 can trigger alert or discouraging graphic outputs from the graphic database 124.

Figure 17:
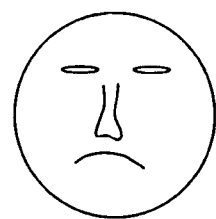
FIG. 17 shows an example of a discouraging avatar.

FIG. 17 shows a simple example of a discouraging avatar, which is face image or model. A discouraging avatar can have an unattractive expression, such as an evil expression. An alert avatar can have a surprising or a fear expression. Since the face is very expressive and facial expressions can be universally understood, facial images or models are preferred in the present invention. In this patent document, an avatar means a virtual character. Since the face is preferred, this document focuses on the virtual face. Thus, an avatar and a virtual face are interchangeable in this document.

Figure 18:
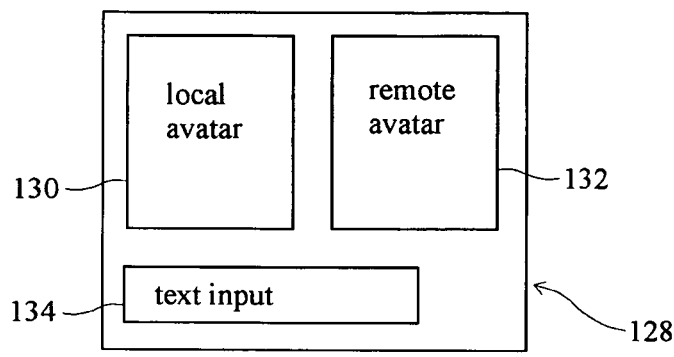
FIG. 18 shows an embodiment of graphic interface in the present invention.

FIG. 18 shows an embodiment of graphic interface 128 in the present invention. The up-right part 132 of the interface 128 is an avatar representing a remote client. The up-left part 130 of the interface 128 is an avatar representing a local client. For example, to client Y 114 in FIG. 14, an avatar at the up-right part 132 represents client X 108 and another avatar at the up-left part 130 represent client Y 114 her/himself. A text input area 134 below the two avatars can allow users to input messages.

Under normal circumstance (i.e. no potentially damaging requests detected), the avatars can have pleasant and relaxing expressions. The avatars can also speak out the messages. For example, the English language has 14 distinctive visemes, which are visual mouth shapes of phonemes. The graphic database (in FIG. 16) can store information of the 14 visemes. While messages are scanned, the visemes can be retrieved from text-to-speech (TTS) system, each viseme will lead to a relevant graphic output.

When a potentially damaging requests are detected, special graphic outputs (e.g. the avatar in FIG. 17) will replace the normal avatar. For example, when the messages send from client X 108 to client Y 114 are detected as containing potentially damaging requests, instructions 122 will be triggered. In client Y 114's computer, a discouraging avatar can be displayed as the remote model 132, and an alert avatar can be displayed as the local model 130. Therefore, intuitive visual information will instantly given to client Y 114. A substantial benefit is that the system can instantly make client X 108 less attractive to client Y 114, and make client Y 114 instantly be aware of potential damage. Since discouraging and alert avatars can also be instantly displayed in client X 108's computer, client X 108 is instantly discouraged or penalized for his behavior. A penalty scheme can be applied. Penalty points can be added to client X 108's account each time he sends out a potentially damaging request. The penalty points can be fed to the instructions 122 in FIG. 16. In other words, the more penalty points, the more unattractive the predator will be. In a chat session, cumulative penalty points can lead to a client expelled from the chat session, and unable to join again for some time.

The visual information can be enhanced by audio signals. For example, at the same time an avatar indicates bad intentions, the avatar's voice can also become less attractive and more obviously threatening. An avatar's voice can be modified by changing frequency components, pitch, rate, emphasis, etc.

Figure 19:
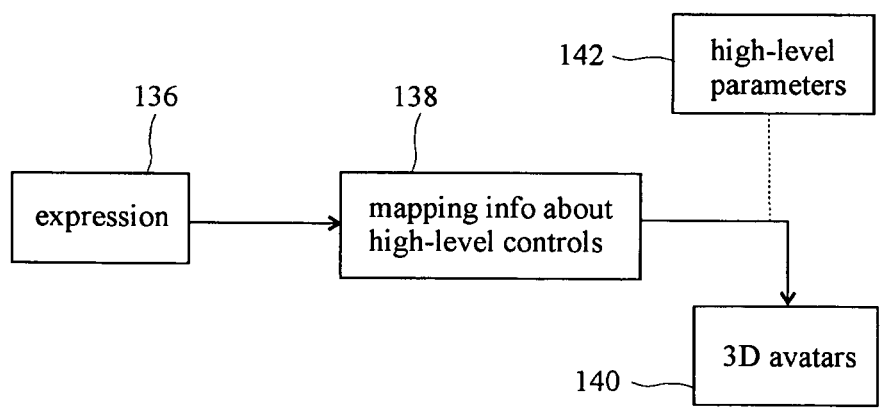
FIG. 19 shows high-level controls are used to control 3D avatars.

If 3D avatars are used to present clients in chat sessions, high-level controls can be used to control the avatars. FIG. 19 shows a preferred embodiment. An effective method in 3D modeling and animation was proposed by Huang*. This patent document takes the method as a preferable implementation that offers high-level controls for 3D avatars. Please refer to documents at the end of this specification for technical details. Huang built a direct connection between muscle movement and modification of parametric curves. Therefore, control points of the curves offer high-level abstraction of muscle movements/expressions. For example, in generating happiness expression, a muscle near the ear pulls the mouth outwards and upwards. To simulate this effect, control points near the ear and simulating the muscle are shifted outward and upward, or their weights are increased. In generating sadness expression, a muscle located at the lower-outer sides of the mouth contracts and pulls the mouth corners downwards. To simulate this effect, control points located at the lower-outer sides of the mouth and simulating the muscle are moved outward from the mouth, or their weights are increased (Huang*). Since each expression is a direct result of certain muscle movement, the muscle movement can be simulated by modifying the high-level controls (i.e. control points of the curves).

In FIG. 19, expression requests 136 (can be sent from instructions 122) are fed into a functional module 138 that offers mapping information about high-level controls. The mapping information can include a mapping between expressions and relevant modification of high-level controls (Huang*). The mapping then generates high-level parameters 142 (e.g. modification of control points), which modifies 3D avatars 140. By using high-level controls, the amount of information sent between clients and service providers is significant low, thus requesting less bandwidth.

Conclusion, Ramification, and Scope

The present invention has a number of significant advantages and benefits.

User operations are simple and intuitive, since they only interact with the virtual muscles or higher level abstractions. The underlying mathematical operation is hidden from users.

The connection between the user interaction and the underlying operation is intuitive and straight forward.

The simulation mechanism is anatomy-based and thus the result will be realistic.

The present invention can offer customized human computer interface.

Avatars can be controlled by high-level parameters and coding efficiency can be improved.

Potential damaging information is graphically indicated, which is very intuitive to users.

Graphic indication can preferably use facial avatars, which can be universally understood.

Users are protected in real-time.

Potential predators are discouraged in real time.

Parenting guidance that is substantially needed in the prior art is significantly decreased or diminished.

Decrease the pressure of law enforcement personnel.

In the prior art, user customization of avatars is very limited. Since the avatars are basically predefined by animators. The present invention allows ordinary computer users to genuinely customize avatars. Users not only can adjust static models, but also can decide dynamic behavior of avatars (e.g. simulated muscles). An ordinary user can intuitively determine how an avatar expresses and speaks.

Since users can very intuitively customize avatars, we can have individualized animation. The individualization can be extremely important, because no a single user may want his/her avatar to be the same as any other people's. In the prior art, animation technologies make individualization/customization of avatars extremely difficult if not entirely impossible.

Users may enjoy the process of animation (or interaction). Furthermore, users may reveal personal flavors or traits in the process. A user can present an avatar or virtual character, just like he/she can present a creation in the real world. It may be to a user's own interest to build an attractive avatar. Users with different background (e.g. ages) may build avatars with distinctive differences. Therefore, the present invention can have a number of additional benefits, e.g. online safety.

The method outlined in the patent document can be used in a wide range of multimedia application. For example, besides online communication, it can be used in education (e.g. facial anatomy).

At another aspect of the present invention, the core inventive concept is that messages are analyzed against rules and potential damaging information is graphically indicated instantly. Therefore, protection and prevention are offered in real time.

The foregoing describes only some embodiments of the present inventions, and modifications obvious to those skilled in the art can be made thereto without departing from the scope of the present invention.

REFERENCES

*Huang, "Modeling object interactions and facial expressions", PCT/AU10/01539.

*Huang, "Parameterization of deformation and simulation of interaction", U.S. patent application Ser. No. 10/416,459.

Other References

*Huang, et al. "NURBS curve controlled modeling for facial animation", *Computers & Graphics*, vol. 27, no. 3, pp. 373-385, June 2003.

We claim:

1. A computerized method for customizing an avatar to communicate information about a user represented by the avatar, comprising:

providing said user with a default avatar with a face having a default facial expression;

including in said default avatar at least one set of elements defining a surface area of the face of the avatar;

providing at least one rational curve near the surface area of the face of the avatar based on the topography of said surface and positioning control points of the rational curve so as to form simulated muscles, said curve being linked with said set of elements by a computer so that said curve controls movement of said elements such that modification of at least a section of said curve has an effect on the topography of the surface that is geometrically analogous to the effect of movement that an underlying muscle mechanism of deformation has on the topography of the surface of a real face;

enabling the user to customize the avatar by dynamically modifying through the computer a default animation of the default facial expression of the avatar by changing said section of said at least one curve so that the location of said surface is dynamically changed to simulate the effect of the movement of the underlying muscle mechanism of deformation on the topography of the surface of the face to communicate information about the user, wherein said modifying of said curves is integral to simulating movement in the surface equivalent to movement due to the underlying muscle mechanism of deformation of said face; and displaying the customized avatar to another user such that the other user can perceive the information about the user represented by the avatar.

2. The method of claim 1 wherein the positioning of control points of said default animation of the default facial expression is determined by their relationship to features of said avatar corresponding to actual facial muscles.

3. The method of claim 1 wherein said animation of the default facial expression is simulated by at least one curve embedded in said avatar.

4. The method of claim 1 wherein the step of enabling the user to customize the animation of the default facial expression comprises the step of providing a user interface tool that enables the default animation to be customized through the computer.

5. The method of claim 1 wherein the step of enabling the user to customize the default facial expression comprises the step of providing a graphic control that enables the default setting of movement to be customized through the computer.

6. The method of claim 1 wherein the step of enabling the user to customize the animation of the default facial expression comprises the step of enabling the user to animate said avatar according to viseme signals.

7. The method of claim 1 wherein the step of enabling the user to customize the animation of the default facial expression comprises the step of enabling the user to animate said customized avatar by blending the customized animation of the default facial expression and viseme signals.

8. The method of claim 1 wherein the avatar is loaded to a service provider system through a communication channel.

9. The method of claim 8 wherein the avatar is only reloaded to said service provider system when the avatar is modified.

10. The method of claim 8 wherein the step of displaying the customized avatar comprises the step of sending information representing the modification of the avatar to said service provider.

11. A service provider system that provides service to a plurality of users, comprising:
- a mediating component for enabling a plurality of users to communicate;
- an avatar collecting component that enables uploading to the service provider system of three-dimensional avatar information including a customized animation of a facial expression of the avatar, the avatar being customized for and representing one of the plurality of users, said avatar including at least one set of elements defining a surface area of face of the avatar, a rational curve positioned relative to and near the surface area of the face of the avatar based on the topography of said surface and linked with said set of elements by a computer so that said curve controls movement of said elements, control points of the rational curve are implemented so as to form simulated muscles such that modification of at least a section of said curve has an effect on the topography of the surface that is geometrically analogous to the effect of movement that an underlying muscle mechanism of deformation has on the topography of the surface of a real face, said curve being linked with said set of vertices, elements said computer enabling the user to customize the avatar by dynamically modifying the default facial expression of the avatar by changing said section of said at least one curve so that the location of said surface is dynamically changed to simulate the effect of the movement of the underlying muscle mechanism of deformation on the topography of the surface of the face to communicate information about the user, wherein said modifying of said curves is integral to simulating movement in the surface equivalent to movement due to the underlying muscle mechanism of deformation of said face;
- a data storage component for storing the customized avatars for a plurality of users;
- a receiving component for receiving a request from a first user to communicate with a second user;
- an avatar retrieving component that retrieves from the data storage component the customized-avatar representing the first user; and
- a dispatching component for providing the retrieved customized-avatar representing the first user in a communication from the first user to the second user.

12. The service provider system of claim 11 wherein said uploaded avatar information includes a set of vertices and related texture images.

13. The service provider system of claim 11 wherein said uploaded avatar information comprises information representing the modification of an avatar after a user has customized the avatar.

14. The method of claim 1, wherein enabling the user to customize the avatar by modifying the default animation of the facial expression comprises providing a user interface to change control points corresponding to the animation of the avatar.

15. The method of claim 14, wherein the control parameters act on the facial expression in a manner equivalent to a virtual muscle of a face.

16. A computerized method for customizing an avatar of a person to communicate information about the person represented by the avatar, comprising:
- providing a user with a default avatar including at least one set of elements defining a surface area of the avatar,
- providing at least one rational curve near the surface area of the avatar based on the topography of said surface and positioning control points of the rational curve so as to form simulated muscles, said curve being linked with said set of elements by a computer so that said curve controls movement of said elements such that modification of at least a section of said curve has an effect on the topography of the surface that is geometrically analogous to the effect of movement that an underlying muscle mechanism of deformation has on the topography of the surface of a real object;
- enabling the user to customize the avatar by dynamically modifying a default animation of the avatar by changing at least a section of said curve so that the location of said surface is dynamically changed to simulate the effect of the movement of the underlying muscle mechanism of deformation on the topography of the surface to communicate information about the user, wherein said modifying of said curves is integral to simulating movement in the surface equivalent to movement due to the underlying muscle mechanism of deformation of said user, said change in the mechanism of animation being achieved by modifying characteristics of at least one of the rational curve and at least one control point; and
- displaying the customized avatar to another user such that the other user can perceive the information about the user represented by the avatar.

17. The method of claim 16 wherein the step of enabling the ordinary user to customize the avatar comprises:
- displaying the default avatar to the user, wherein the display shows the boundaries of the surface areas defined by each set of elements and the position of simulated muscles between control points; and
- permitting the user to change on the display at least one of (i) the boundary locations of the surface areas, (ii) the location of the control points defining the simulated muscles, and (iii) the weights of the control points.

18. The method of claim 16 wherein the avatar is three-dimensional and the surface areas are polygonal.

19. The method of claim 16 further including the step of animating the face of the avatar with visemes by:
- generating a speech signal;
- transforming the speech signal to equivalent muscle movement;
- transforming the muscle movement to a series of curve modifications; and
- applying the modifications to the model of the avatar.

* * * * *